April 26, 1966   R. FAVRE   3,248,623
FEEDBACK CONTROLLED ELECTROMAGNETIC DRIVE FOR OSCILLATORS
Filed May 22, 1962   3 Sheets-Sheet 1

April 26, 1966 R. FAVRE 3,248,623
FEEDBACK CONTROLLED ELECTROMAGNETIC DRIVE FOR OSCILLATORS
Filed May 22, 1962 3 Sheets-Sheet 2

United States Patent Office 3,248,623
Patented Apr. 26, 1966

3,248,623
FEED BACK CONTROLLED ELECTROMAGNETIC DRIVE FOR OSCILLATORS
Robert Favre, Lausanne, Switzerland, assignor to Fabriques Movado, La Chaux-de-Fonds, Switzerland, a Swiss company
Filed May 22, 1962, Ser. No. 196,817
Claims priority, application Switzerland, May 23, 1961, 5,947/61
5 Claims. (Cl. 318—132)

The present invention refers to a time base, particularly for electric time-measuring devices, consisting of a mechanical oscillator as well as of an electro-magnetic device driving this oscillator with at least one active element, preferably a transistor, at least one control coil being in the control circuit of the transistor and at least one driving coil in the output circuit of the transistor.

Time bases for watches are already known which operate with an oscillator consisting either of a balance, or a tuning fork, or a piezo-electric oscillator or a torsion oscillator. Torsion oscillators operate with frequencies of 10 to 150 c.p.s. and thus comprise a medium frequency range lying between that of a balance and that of a piezo-electric oscillator.

This invention which will be used with a torsion oscillator is characterized by the fact that this oscillator contains at least one permanent magnet, which in its outside magnetic circuit is divided by two independent armature parts and the extremities of these form two gaps in front of which move the poles of the permanent magnet during oscillation which results in periodic changes of reverse sign of the magnetic flux with at least one of the armature parts becoming the core of the control coil and at least one other armature part becoming the core of the driving coil.

According to the invention a time base should preferably be developed in such a way that the oscillator should have two permanent magnetic rods, one of the armature parts co-operating with the first permanent magnet carrying the control coil and one of the other armature parts co-operating with the second permanent magnet carrying the driving coil.

In order to obtain a dynamically balanced system it is possible according to a further embodiment to fit the oscillator with two laterally contiguous arms, one of which at least should carry a permanent magnet, and one at least of the control or driving coils should be arranged round that armature part which co-operates with both permanent magnets and the oscillation of the arms should be regulated in such a way that both magnetic fluxes going through the two armature parts should change in the same direction.

The diagram represents several embodiments of the invention.

Figure 1:
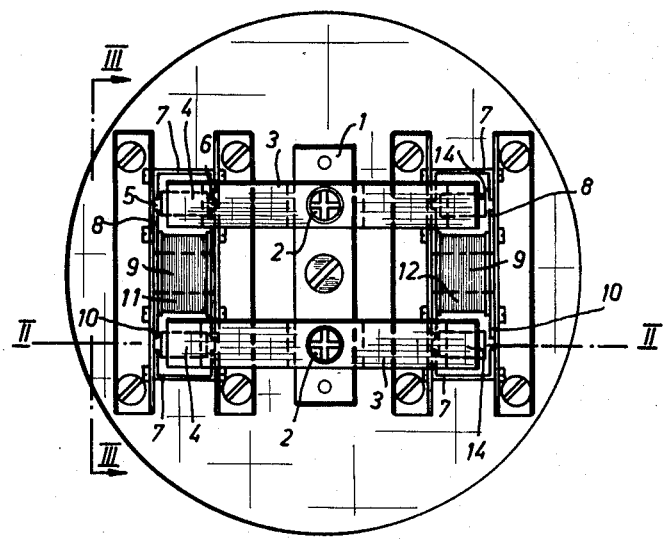
Figure 2:
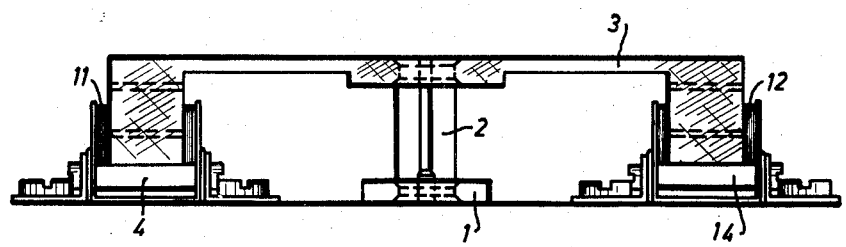
Figure 3:
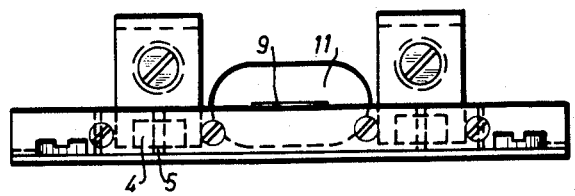
Figure 4:
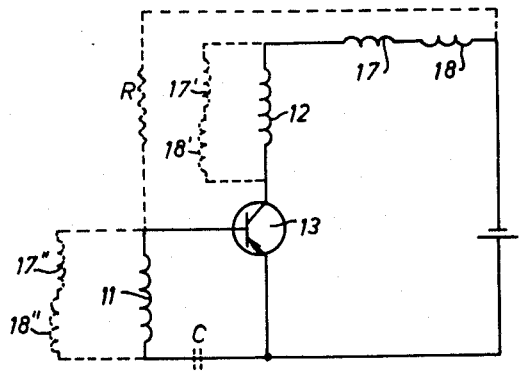
Figure 5:
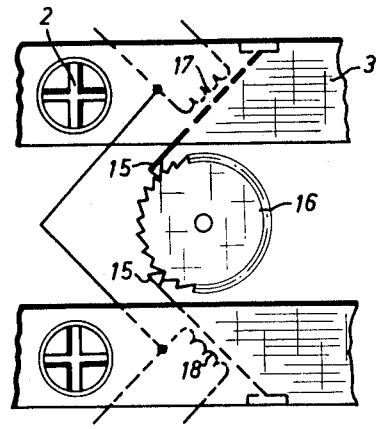
Figure 6:
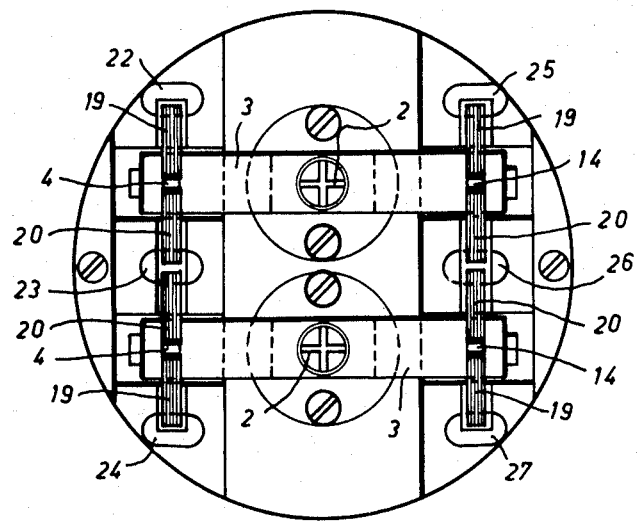
Figure 7:
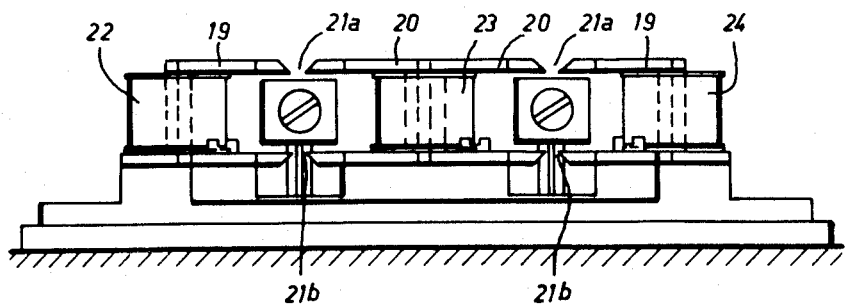

FIGURE 1 is a top view of a first embodiment.
FIGURES 2 and 3 are cross-section views of the system taken at lines II—II and III—III respectively as shown in FIGURE 1.
FIGURE 4 shows a circuit diagram of my invention.
FIGURE 5 is a possible arrangement for transforming the oscillation motion into a rotation motion, and
FIGURES 6 and 7 are a top and side view of another embodiment of the time base according to the invention.

According to FIGURE 1 the time base is fitted with a support 1 which is attached to the bottom plate of a watch on which are fixed two torsion springs 2 with cross-shaped cross-sections. The upper end of each of these springs is provided with one swinging arm 3. The characteristics of these torsion springs as well as the way of assembling them are already known.

The two arms 3 lie laterally next to each other and oscillate, parallel with the surface of the clockwork-movement around the axes of their torsion spring. They extend over the larger part of the clockwork surface from one end to the other so as to obtain the maximum moment of inertia in relation to the oscillating axis. There is a magnetic rod 4 and 14 respectively at each end of both oscillating arms and both poles move past the gaps formed by the two armature parts 7 and 8, 10 and 7 respectively and move past the gaps 5 and 6 respectively. The armature parts are made of soft iron.

The outer armature parts 7 are U-shaped and the plane defined by the two U-tails lie within the oscillation plane, the two central armature parts 8, 9 and 10 respectively being in the shape of an H whose wide cross-bar 9 lies parallel with the oscillating plane of the arms. Cross-bar 9 of the armature parts on one side of the oscillation system forms at the same time the core of the control coil 11 whereas the corresponding cross-bar 9 in the armature parts of the other side of the oscillation system forms the core of the driving coil. The outside magnetic field of each of the permanent magnets 4 and 14 respectively closes over two iron paths that is to say over armature part 7 on the one hand and armature parts 8 and 9, and 10 and 9 respectively on the other hand. During the oscillation of the permanent magnet periodic changes of opposite sign or polarity in the magnetic fluxes of both armature parts co-operating with a permanent magnet are produced, the magnetic reluctance of the whole circuit remaining, however, constant. Thus interference from the oscillation frequency defined by mechanical elements is avoided.

The flux change in core 9 on the control side produces an electric impulse in control coil 11 connected to the base emitter circuit of a transistor 13 as shown in FIGURE 4, which puts this transistor into the conducting state. The collector current of this transistor excites the driving coil 12 which lies in the output circuit of the transistor, this coil acting in turn upon magnet 14 on the driving side of the two oscillating arms 3 whereby the oscillating arms 3 receive periodical mechanical impulses.

As the arms 3 oscillate with the same frequency but in opposite directions, the action of the change in flux of the cores 9 of the control and driving coil respectively working with both magnets 4 and 14 respectively; moreover as a result of this form of oscillation the system is in dynamic equilibrium. The frequency of the oscillation is adjustable by screws at the ends of the oscillating arms.

FIGURE 5 represents a device for transforming the oscillation motion of arm 3 into a rotation motion in order to drive the wheel of the watch. This device consists of two elastic elements or panels 15 whose ends work with the teeth of a ratchet 16 which represents the driving wheel of the clockwork. The movements of the elements or pawls 15 are at all times set in opposite directions and their ends are so arranged that the two elements or pawls can work alternately, that is to say the driving movement of one element or pawl corresponds to the resetting movement of the other element or pawl. The simultaneous use of two such elements permits driving the wheel by forward steps which are only half the size of the pitch of this wheel whereby the use of elastic elements with greater pitch becomes possible as they can only be used in the case of elastic elements without any particular means of blocking. In addition the device shown on FIGURE 5 contains two coils 17 and 18 which are controlled by the extension voltage of one of the said driving or control coils and periodically attract the two elements or pawls 15 which are fitted with small permanent magnets for this purpose. The longitudinal movement of the elements 15 is tangential to the periphery of ratchet 16 and thus a cross-wise movement is superimposed so that the ends of elastic elements 15 describe approximately an elliptical or circular motion. The two above-mentioned components of motion are adjusted in such a way that during the movement of the element 15 in the direction of the drive of the ratchet 16 this element is pressed against ratchet 16 whereas during resetting this element or pawl is lifted from ratchet 16 by the action of coils 17 and 18 respectively.

Coils 17 and 18 may e.g. be arranged in the electric-circuit parallel to the driving coil 12 as shown in FIGURE 4. The coils are marked 17' and 18' in the second embodiment of FIGURE 4b. In this diagram the coils 17' and 18' are excited at the same time as the driving coil 12 by a sinusoidal current.

According to another version the coils may be arranged in the control circuit of the transistor parallel with the control coil 11 as in FIGURE 4 where the coils are marked 17'' and 18'' and the other components are designated as in 4a. The additional elements R and C, are inserted in the various embodiments when a silicon-transistor is used.

FIGURES 6 and 7 represent a second version of the time base invention. This time base contains again two oscillating arms 3 which are fixed to cross-shaped torsion springs 2 and carry magnetic rods 4, 14 respectively of each end, which as a variant of the first embodiment point in parallel direction to the oscillating axes. The ends of the arms, together with magnets 4, 14 move in front of the gaps 21a and 21b (FIGURE 7), the U-shaped armature consisting of strips 19 and 20 respectively. The bottom surfaces of the U-shaped armature are at the same time the cores of the three coils 22, 23 and 24 and 25, 26 and 27 respectively, the two coils 23, 26 respectively having two common cores 20. The first group of coils forms the control part and the second group of coils the driving part of the oscillation and their function is identical with that of the first version.

The above-described time bases invention may be produced in many versions which may relate to the fitting and developing of the armature parts as well as that of the coils. e.g. both time bases described above may be so constituted that 7 or 19 coils respectively are only provided on the outer armature parts. Furthermore, the time base of the first embodiment (FIGURE 1) may be very simply changed in such a way that each of the arms carries a magnet on one side only, each of the two aramature parts co-operating with one of the magnets carrying one of the coils.

Finally, the time base may be fitted with only one oscillating arm which entails absence of a constant dynamic equilibrium. This oscillating arm carries a magnet at each end one magnet co-operating with the control part and the other with the driving part of the time base.

I claim:
1. A feedback controlled electromagnetic drive for oscillators comprising a pair of oscillatable arms, torsion spring members each oscillatably mounting a respective one of said arms, a permanent magnet fixed on each of said arms adjacent an extremity of each arm, means comprising electromagnetically energized means defining air gaps adjacent which said magnets oscillate, a control circuit comprising means for receiving feedback energy from said magnets for energizing said electromagnetically energized means successively in opposite polarities to develop periodic, successive impulses to periodically actuate said magnets thereby to periodically oscillate said arms.

2. A feedback controlled electromagnetic drive according to claim 1, in which said magnets are disposed parallel to said torsion spring members, and in which said means defining said air spaces comprises two U-shaped portions defining a magnetic circuit and defining two oppositely disposed air gaps, and said magnet being disposed normal to said air gaps.

3. A feedback controlled electromagnetic drive according to claim 1, in which said arms are mounted in parallel for oscillation out of phase.

4. A feedback controlled eletcromagnetic drive for oscillators comprising a pair of oscillatable arms, torsion spring members each oscillatably mounting a respective one of said arms, a permanent magnet fixed on each of said arms adjacent an extremity of each arm, means comprising electromagnetically energized means defining air gaps adjacent which said magnet oscillate, a control circuit comprising means for receiving feedback energy from said magnets for energizing said electromagnetically energized means successively in opposite polarities to develop periodic, successive impulses to periodically actuate said magnets thereby to periodically oscillate said arms, a ratchet wheel disposed for receiving driving energy from the oscillations of said arms, means connected to said arms for imparting energy to said ratchet wheel for rotatably driving said ratchet wheel in response to said oscillations.

5. For use in a time piece a feedback controlled electromagnetic drive for oscillators comprising, at least one oscillatable arm, a torsion member oscillatably mounting said arm, a permanent magnet fixed to said arm adjacent an extremity of said arm, means comprising electromagnetically energized means defining an air gap adjacent which said magnet oscillates, a control circuit comprising means for receiving feedback energy from said magnet for energizing said electromagnetically energized means successively in opposite polarities to develop periodic, successive impulses to periodically actuate said magnet thereby to periodically oscillate said arm, means to convert the oscillatory motion of said arm to rotary motion for imparting rotary drive from said drive, said control circuit comprising a pair of control coils each co-operating with a respective one of said arms, and a respective pair of working coils each cooperating with a respective one of said arms, and said coils being in each case arranged at the outer sides of the ends of said arms.

References Cited by the Examiner

UNITED STATES PATENTS

| 2,843,742 | 7/1958 | Clowen | 310—36 X |
| 2,895,095 | 7/1959 | Guyton | 318—127 |
| 2,961,587 | 11/1960 | Aeshmann | 318—132 |
| 2,999,966 | 9/1961 | Blyner et al. | 138—132 |
| 3,105,915 | 10/1963 | Staunton | 310—37 |

FOREIGN PATENTS 583,815   11/1924   France.

ORIS L. RADER, *Primary Examiner.*
MILTON O. HIRSHFIELD, *Examiner.*